UNITED STATES PATENT OFFICE.

FRIEDRICH C. MUSSGILLER AND ROBERT W. SCHEDLER, OF JERSEY CITY HEIGHTS, NEW JERSEY.

IMPROVEMENT IN TREATING BEER AND OTHER LIQUIDS.

Specification forming part of Letters Patent No. 169,830, dated November 9, 1875; application filed October 20, 1875.

*To all whom it may concern:*

Be it known that we, FRIEDRICH C. MUSSGILLER and ROBERT W. SCHEDLER, both of Jersey City Heights, in the county of Hudson and State of New Jersey, have invented a new and useful Improvement in Treating Beer and other Liquids, which improvement is fully set forth in the following specification:

This invention consists in treating beer and other liquids of a similar nature with lumps of bicarbonate of soda, or other alkali, said lumps being compacted by means of a suitable cement, so that their specific gravity exceeds that of the liquid to be treated, and that, when one or more such lumps are dropped into the liquid, they sink down to the bottom of the vessel containing the liquid, and that the carbonic acid evolved from said lumps is compelled to permeate the body of the liquid, and at the same time, by forming said lumps of suitable sizes, the quantity of alkaline matter introduced into a certain quantity of liquid can be easily controlled. Together with the alkaline lumps, may be used lumps of tartaric or other suitable acid, compacted in the same manner as the alkaline lumps, so that the amount of carbonic acid evolved from said alkaline lumps can be easily kept under control.

It is a common practice with brewers, and others, to use bicarbonate of soda, either alone or together with tartaric acid, in the manufacture of beer, sparkling wines, and other effervescent liquids, for the purpose of increasing the life of such liquids.

The mode of applying such article or articles—by brewers, for instance—is to put about one ounce of the bicarbonate of soda to each quarter barrel with a table-spoon, the bicarbonate employed being in the form of a powder.

It is obvious that this way of operating must produce a great many irregularities as to the taste and reaction of the beer on the human body. The addition of too much bicarbonate of soda will impart to the beer an alkaline taste; too little will leave it acid.

Furthermore, the alkaline powder, on being thrown into a barrel of beer, will float on the surface of the liquid, and immediately evolve carbonic acid, a large portion of which is lost, together with the beer which is thrown out by the action of the acid, before the barrel can be closed by a bung. Besides this, the operation of filling barrels is carried on in a great hurry, and a large quantity of the soda handled with a spoon is spilled over the barrel and wasted.

If the brewers wish their beer to contain a large quantity of tartaric acid, they throw into each barrel a few crystals of tartaric acid in addition to an increased quantity of bicarbonate of soda. The result of this operation is that each barrel has different properties, there being no precaution taken to control the quantities of soda and of acid.

These disadvantages we have obviated by preparing both the alkali and the acid in solid lumps of greater specific gravity than that of the liquid in which they are to be used, and of different specific sizes. This object we obtain by mixing the powdered alkali or acid with a suitable cement, such as a solution of dextrine, and then compressing the same in molds of suitable size and shape.

The advantage of using the alkali or acid in this shape is perceptible at once. The lumps of alkali or acid being in compact form when dropped into a barrel filled with beer, ale, or other liquid, will sink to the bottom, and the carbonic acid evolved from them is forced to stay in the liquid. The barrel can be easily closed by a bung without losing a particle of carbonic acid, or of beer, and the alkali and acid can be introduced into the barrel without any waste. Besides this, the weight or size of our lumps is so gaged that each barrel will receive the exact quantity of alkali and of acid required, and that the liquid in a number of barrels, after having been treated with the alkali and acid, will be of uniform quality.

What we claim as new, and desire to secure by Letters Patent, is—

The process of treating beer, and other liquids of a similar nature, with lumps of bicarbonate of soda, or other alkali, either alone or in connection with a suitable acid, the specific gravity of such lumps being greater than that of the liquid to be treated, substantially as set forth.

In testimony that we claim the foregoing, we have hereunto set our hands and seals this 11th day of October, 1875.

F. C. MUSSGILLER. [L. S.]
ROBT. W. SCHEDLER. [L. S.]

Witnesses:
 JOS. SCHEDLER,
 E. F. KASTENHUBER.